United States Patent
Cincione et al.

(10) Patent No.: US 12,444,083 B2
(45) Date of Patent: Oct. 14, 2025

(54) STORAGE SYSTEMS WITH CALIBRATION CAPABILITIES

(71) Applicant: Apple Inc., Cupertino, CA (US)

(72) Inventors: Dominic P Cincione, San Francisco, CA (US); Christopher Patton, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/727,533

(22) PCT Filed: Jan. 18, 2023

(86) PCT No.: PCT/US2023/060827
§ 371 (c)(1),
(2) Date: Jul. 9, 2024

(87) PCT Pub. No.: WO2023/147236
PCT Pub. Date: Aug. 3, 2023

(65) Prior Publication Data
US 2025/0086834 A1    Mar. 13, 2025

Related U.S. Application Data

(60) Provisional application No. 63/303,420, filed on Jan. 26, 2022.

(51) Int. Cl.
*G06T 7/80* (2017.01)
*A45C 11/04* (2006.01)
(Continued)

(52) U.S. Cl.
CPC ............... *G06T 7/80* (2017.01); *A45C 11/04* (2013.01); *G06T 7/74* (2017.01); *G06V 10/145* (2022.01); *G06T 2207/30201* (2013.01)

(58) Field of Classification Search
CPC ... G06T 7/80; G06T 7/74; G06T 2207/30201; G06V 10/145; A45C 11/04
See application file for complete search history.

(56) References Cited

U.S. PATENT DOCUMENTS

| 7,002,551 B2 | 2/2006 | Azuma et al. |
| 9,599,825 B1 | 3/2017 | Mullins et al. |
(Continued)

FOREIGN PATENT DOCUMENTS

| CN | 111788572 A | * 10/2020 | ............ G06V 10/764 |
| WO | WO-2015108225 A1 | * 7/2015 | ............ G02B 27/017 |

OTHER PUBLICATIONS

Dietmar Wueller, "A new dimension in geometric camera calibration," Electronic Imaging, Jan. 2020, pp. 18-1-18-5, Society for Imaging Science and Technology, USA.

*Primary Examiner* — Stephen G Sherman
(74) *Attorney, Agent, or Firm* — Treyz Law Group, P.C.; Kendall P. Woodruff

(57) ABSTRACT

A system may include a head-mounted device and a storage case for storing and calibrating the head-mounted device. The storage case may include a recess that receives the head-mounted device. The case may include optically detectable features for calibrating cameras in the head-mounted device. For example, the case may include optical charts, physical fiducials, and/or reflective calibration spheres for calibrating inward-facing cameras on the head-mounted device such as gaze tracking image sensors. For calibrating outward-facing cameras on the head-mounted device that have larger focal distances, the case may include a light source and a diffractive optical element to create a light pattern that virtually originates from infinity. The case may include cameras for capturing images of displayed images on the head-mounted device to determine if a
(Continued)

waveguide and display in the head-mounted device are misaligned.

19 Claims, 7 Drawing Sheets

(51) Int. Cl.
*G06T 7/73* (2017.01)
*G06V 10/145* (2022.01)

(56) References Cited

U.S. PATENT DOCUMENTS

| | | |
|---|---|---|
| 9,710,057 B2 | 7/2017 | Mikhailov et al. |
| 9,788,714 B2 | 10/2017 | Krueger |
| 10,054,796 B2 | 8/2018 | Bickerstaff et al. |
| 10,078,377 B2 | 9/2018 | Balan et al. |
| 10,360,877 B2 | 7/2019 | Osman et al. |
| 11,175,457 B1 | 11/2021 | Trail |
| 11,202,043 B1 | 12/2021 | Elazhary et al. |
| 2010/0309097 A1 | 12/2010 | Raviv et al. |
| 2014/0375681 A1 | 12/2014 | Robbins et al. |
| 2015/0198438 A1* | 7/2015 | Hetzler .............. G01B 11/2441 356/458 |
| 2016/0262608 A1 | 9/2016 | Krueger |
| 2017/0232346 A1 | 8/2017 | Rofougaran et al. |
| 2019/0072454 A1* | 3/2019 | Lee ...................... G02B 27/106 |
| 2020/0007849 A1* | 1/2020 | Chang .................. H04N 13/246 |
| 2020/0209628 A1 | 7/2020 | Sztuk et al. |
| 2021/0026147 A1* | 1/2021 | Harder .................. G09G 3/001 |

\* cited by examiner

STORAGE SYSTEMS WITH CALIBRATION CAPABILITIES

This application claims priority to U.S. provisional patent application No. 63/303,420, filed Jan. 26, 2022, which is hereby incorporated by reference herein in its entirety.

FIELD

This relates generally to electronic devices, and, more particularly, to electronic devices such as head-mounted devices.

BACKGROUND

Electronic devices have components such as displays and other optical components. During operation, there is a risk that components may become misaligned with respect to each other due to drop events and other undesired high-stress events. This poses challenges for ensuring satisfactory component performance.

SUMMARY

A system may include a head-mounted device such as a pair of glasses and a storage case for storing and calibrating the head-mounted device. The head-mounted device may include displays such as projector displays and may include associated optical components. The optical components may include waveguides that are used in providing images received from the displays to corresponding eye boxes for viewing by a user.

The storage case may include a recess for receiving the head-mounted device. The case may include optically detectable features for calibrating cameras in the head-mounted device. For example, the case may include optical charts, physical fiducials, and/or reflective calibration spheres for calibrating inward-facing cameras on the head-mounted device such as gaze tracking image sensors. For calibrating outward-facing cameras on the head-mounted device that have larger focal distances, the case may include a light source and a diffractive optical element to create a light pattern that virtually originates from infinity. The case may include cameras for capturing images of displayed images on the head-mounted device to determine if a waveguide and display in the head-mounted device are misaligned.

The case may include other features for calibrating the head-mounted device. For example, a lid on the case may apply an expected amount of pressure to a force sensor on the head-mounted device when the head-mounted device is stored in the case. Control circuitry in the system may compare the measured force value from the force sensor with the expected force value to determine if the force sensor needs calibration. A motion sensor in the case may be used to calibrate motion sensors in the head-mounted device.

DETAILED DESCRIPTION

A system may include one or more electronic devices such as a head-mounted device and a storage case for storing the head-mounted device. The head-mounted device may include optical components such as displays, one or more outward-facing cameras, one or more inward-facing cameras, etc., and/or may include other components such as force sensors and motion sensors. When the head-mounted device is not in use, the head-mounted device may be stored in the storage case. The storage case may have calibration circuitry and components for calibrating the head-mounted device while the head-mounted device is received within the storage case. For example, the storage case may include optical sensors such as cameras for calibrating displays in the head-mounted device and one or more additional components such as optical charts, camera calibration charts, focus charts, diffractive optical elements for creating light patterns, and/or reflective calibration spheres for calibrating optical sensors in the head-mounted device such as outward-facing cameras and inward-facing cameras. The storage case may have a lid with one or more protrusions for calibrating a force sensor in the head-mounted device. Using information from the sensors in the storage case and/or sensors in the head-mounted device, control circuitry in the system may coordinate operation of the head-mounted device, may perform calibration operations to compensate for measured component misalignment, and/or may take other actions.

Figure 1:
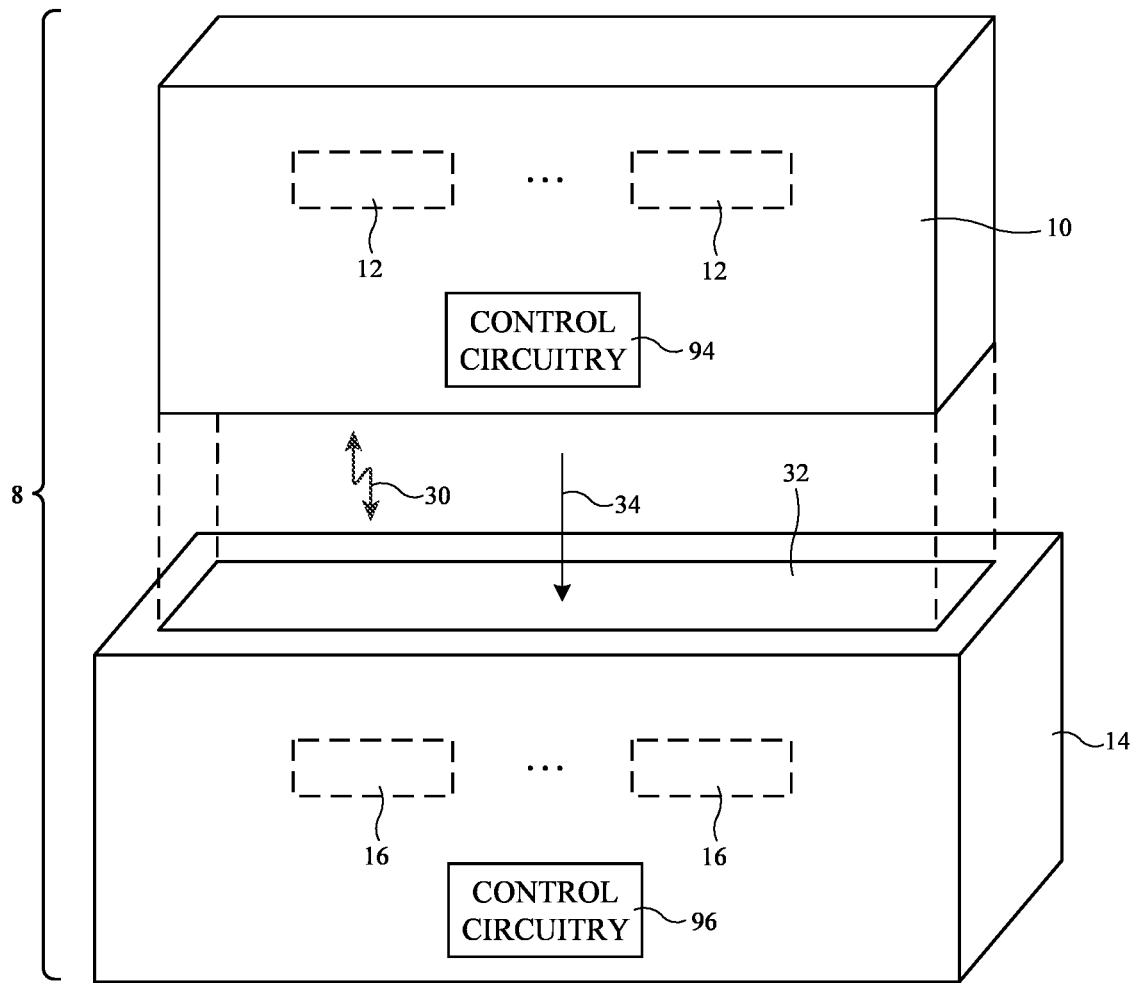
FIG. 1 is a perspective view of an illustrative head-mounted device and corresponding storage case in accordance with an embodiment.

FIG. 1 is a schematic diagram of an illustrative system of the type that may include one or more electronic devices with calibration circuitry. As shown in FIG. 1, system 8 may include electronic device 10 and storage case 14. Devices that may be used for device 10 may include head-mounted devices (e.g., goggles, glasses, helmets, and/or other head-mounted devices), cellular telephones, tablet computers, peripheral devices such as headphones, game controllers, and/or other input devices. Device 10 may, if desired, include one or more laptop computers, computer monitors containing embedded computers, desktop computers, media players, or other handheld or portable electronic devices, smaller devices such as wristwatch devices, pendant devices, ear buds, or other wearable or miniature devices, televisions, computer displays that do not contain embedded computers, gaming devices, remote controls, embedded systems such as systems in which equipment is mounted in a kiosk, in an automobile, airplane, or other vehicle, removable external cases for electronic equipment, straps, wrist bands or head bands, removable covers for electronic devices, cases or bags that receive and carry electronic equipment and other items, necklaces or arm bands, wallets, sleeves, pockets, or other structures into which electronic equipment or other items may be inserted, part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, system 8 includes a head-mounted device 10 such as a pair of glasses (sometimes referred to as augmented reality glasses) that is received within a storage case such as storage case 14. Case 14 may include a recess such as recess 32 that receives device 10 by inserting device 10 into recess 32 in direction 34.

System 8 may also include peripherals such as headphones, game controllers, and/or other input-output devices (as examples). In some scenarios, system 8 may include one or more stand-alone devices 10. In other scenarios, multiple devices 10 in system 8 exchange information using wired and/or wireless links, which allows these devices 10 to be used together. For example, a first of devices 10 may gather user input or other input that is used to control a second of devices 10 (e.g., the first device may be a controller for the second device). As another example, a first of devices 10 may gather input that is used in controlling a second device 10 that, in turn, displays content on a third device 10.

Devices 10 and 14 may include control circuitry 94 and 96, respectively. Control circuitry 94 and 96 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in the control circuitry may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

Device 10 and case 14 may include components 12 and 16, respectively. To support communications between device 10 and case 14 and/or to support communications between equipment in system 8 and external electronic equipment, device 10 and case 14 may include wired and/or wireless communications circuitry. The communications circuitry of device 10 and case 14, which may sometimes be referred to as control circuitry and/or control and communications circuitry, may include antennas, radio-frequency transceiver circuitry, and other wireless communications circuitry and/or wired communications circuitry. The communications circuitry of device 10 and case 14 may, for example, support bidirectional wireless communications between device 10 and case 14 over wireless links such as wireless link 30 (e.g., a wireless local area network link, a near-field communications link, or other suitable wired or wireless communications link (e.g., a Bluetooth® link, a WiFi® link, a 60 GHz link or other millimeter wave link, etc.). Components 12 and 16 may also include power circuits for transmitting and/or receiving wired and/or wireless power and may include batteries.

Components 12 and 16 may include input-output devices. The input-output devices may be used in gathering user input, in gathering information on the environment surrounding the user, and/or in providing a user with output. The input-output devices may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, device 10 and case 14 may use sensors and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Components 12 and 16 may include haptic output devices. The haptic output devices can produce motion that is sensed by the user (e.g., through the user's head, hands, or other body parts). Haptic output devices may include actuators such as electromagnetic actuators, motors, piezoelectric actuators, electroactive polymer actuators, vibrators, linear actuators, rotational actuators, actuators that bend bendable members, etc.

If desired, input-output devices in components 12 and 16 may include other devices such as displays (e.g., to display images for a user), status indicator lights (e.g., a light-emitting diode that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), etc.

Components 16 of case 14 may include calibration circuitry and components for calibrating device 10. For example, components 16 may include optical sensors such as cameras for calibrating displays in the head-mounted device and may include one or more optically detectable features for calibrating cameras in the head-mounted device. Optically detectable features in case 14 may include optical charts, camera calibration charts, focus charts, diffractive optical elements for creating light patterns, and/or reflective calibration spheres for calibrating optical sensors in the head-mounted device such as outward-facing cameras and inward-facing cameras. Components 16 may include protrusions that apply pressure to force sensors in device 10 when device 10 is received within case 14 to calibrate the force sensor. Components 16 may include position sensors such as accelerometers, magnetic sensors such as compass sensors, gyroscopes, and/or inertial measurement units that contain some or all of these sensors. The position sensors may be used to measure location (e.g., location along X, Y, and Z axes), orientation (e.g., angular orientation around the X, Y, and Z axes), and/or motion (changes in location and/or orientation as a function of time). Position sensors that can measure location, orientation, and/or motion may sometimes be referred to herein as position sensors, motion sensors, and/or orientation sensors. Using information from the sensors in storage case 14 and/or sensors in head-mounted device 10, control circuitry in system 8 may coordinate operation of device 10, may perform calibration operations to compensate for measured component misalignment in device 10, and/or may take other actions.

Figure 2:
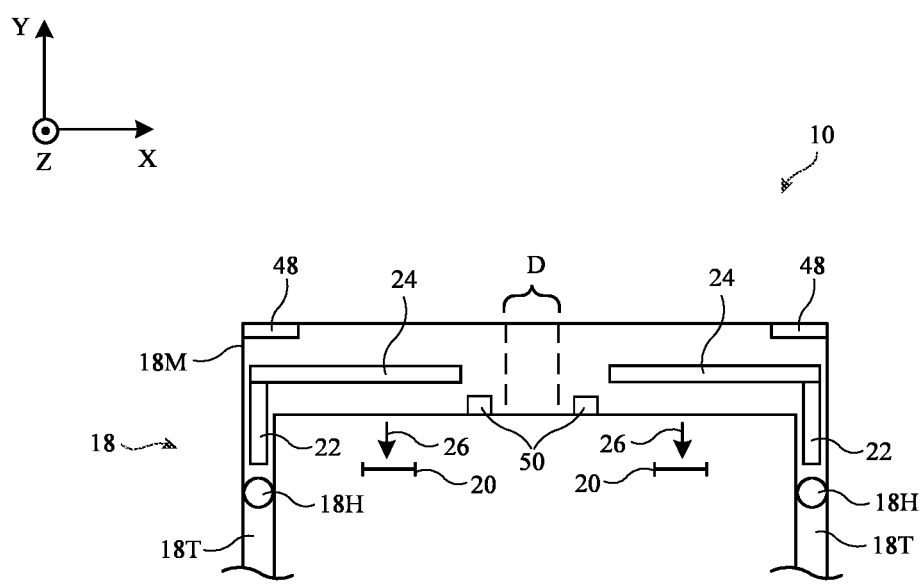
FIG. 2 is a top view of an illustrative head-mounted device in accordance with an embodiment.

A top view of device 10 in an illustrative configuration in which device 10 is a pair of glasses is shown in FIG. 2. A shown in FIG. 2, device 10 may include housing 18. Housing 18 may include a main portion (sometimes referred to as a glasses frame) such as main portion 18M and temples 18T that are coupled to main portion 18M by hinges 18H. Nose bridge portion D may have a recess that allows housing 18 to rest on a nose of a user while temples 18T rest on the user's ears.

Images may be displayed in eye boxes 20 using displays 22 (e.g., projector displays, sometimes referred to as light engines) and waveguides 24. Waveguides 24 may have input couplers that receive light from projector displays 22. This image light is then guided laterally (along the X axis) within waveguides 24 in accordance with the principal of total internal reflection. Each waveguide 24 may have an output coupler in front of a respective eye box 20. The output coupler couples the image light out of the waveguide 24 and directs an image towards the associated eye box 20 for viewing by a user (e.g., a user whose eyes are located in eye boxes 20), as shown by arrows 26. Input and output couplers for device 10 may be formed from gratings and/or other optical structures.

Device 10 may include optical sensing systems such as one or more outward-facing cameras 48 (e.g., a left outward-facing camera and a right outward facing camera) and one or more inward-facing cameras 50 (e.g., a left inward-facing camera and a right inward-facing camera). Outward-facing cameras 48 may be infrared light cameras, visible light cameras, and/or other suitable cameras for capturing images (e.g., depth images, visible light images, infrared images, etc.) of the user's surrounding environment. Inward-facing cameras 50 may be gaze tracking image sensors operating in the infrared light spectrum and/or the visible light spectrum.

Figure 3:
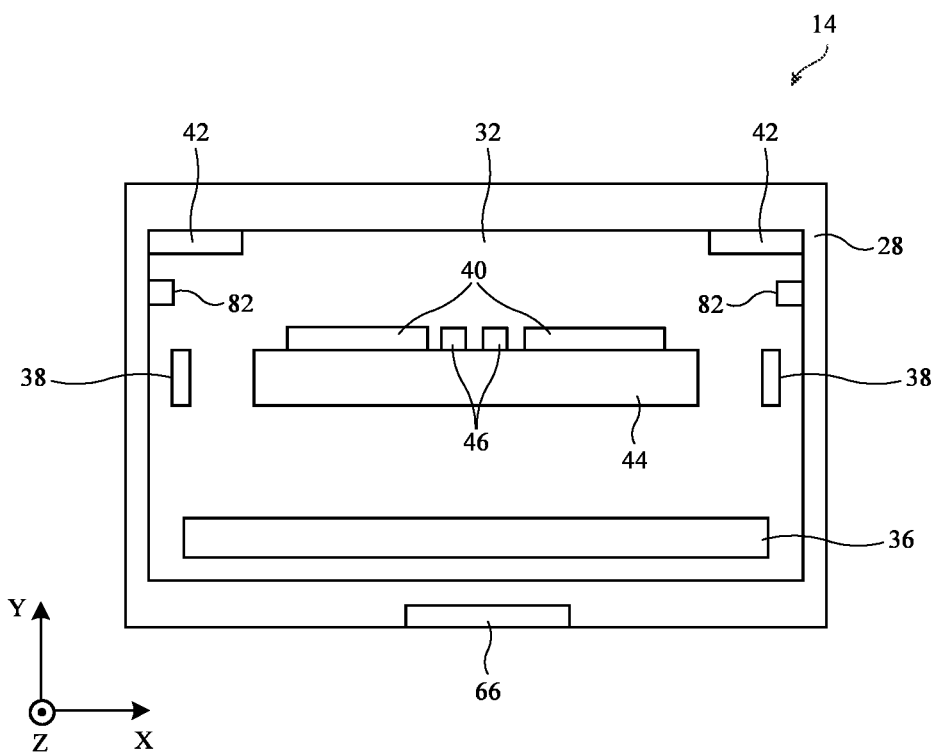
FIG. 3 is a top view of an illustrative storage case having a recess for receiving a head-mounted device in accordance with an embodiment.

FIG. 3 is a top view of an illustrative storage case with calibration components for calibrating a head-mounted device. As shown in FIG. 3, storage case 14 may include a housing such as housing 28. Housing 28, which may sometimes be referred to as an enclosure or case, may be formed of plastic, glass, ceramics, fiber composites, metal, elastomeric polymer (e.g., silicone and/or other stretchable plastics), fabric (e.g., fabric such as woven fabric, knit fabric, braided fabric, fabric that includes stretchable strands of elastomeric material, etc.), other suitable materials (e.g., leather, wood, or other natural materials, crystalline materials, etc.), or a combination of any two or more of these materials. Arrangements in which housing 28 includes waterproof materials, water-resistant materials, and/or oil-resistant materials may also be used. Housing 28 may be formed using a unibody configuration in which some or all of housing 28 is machined or molded as a single structure or may be formed using multiple structures (e.g., an internal frame structure, one or more structures that form exterior housing surfaces, etc.).

Housing 28 may separate an interior region such as recess 32 from an exterior region. Recess 32 may be a device-shaped opening for receiving and storing an electronic device such as head-mounted device 10 of FIG. 2.

Case 14 may include a battery such as battery 36. Power can be conveyed to case 14 from an external power source to power circuitry in case 14, to charge battery 36, and/or to power circuitry in device 10 (e.g., when device 10 is received within case 14). If desired, case 14 may also include an internal power source such as an energy harvesting device, a solar cell, an electromechanical system or piezoelectric component that coverts kinetic energy (e.g., kinetic energy associated with vibrations and/or other movement of case 14) to into electrical power for powering case 14 and/or device 10. Energy may also be harvested using a thermoelectric device that converts heat into electrical power, or other energy harvesting devices.

Power may be conveyed from case 14 to device 10 using contacts 38 (e.g., positive and ground terminals) on case 14 and matching ohmically-contacted contacts on device 10 (e.g., positive and ground terminals in a power receiving circuit in device 10). If desired, power can be conveyed wirelessly between case 14 and device 10. As an example, contacts 38 (e.g., metal pads) may be capacitively coupled (without forming ohmic contact) to contacts on device 10 to allow power to be transferred and/or power can be conveyed using a wireless power transmitter with a coil in case 14 to transmit wireless power signals to a wireless power receiver with a coil in device 10. Inductive power transfer techniques may be used (e.g., wireless power can be transmitted using one or more wireless power transmitting coils in case 14, and transmitted wireless power signals can be received using a power receiving coil in device 10). Received alternating-current wireless power signals from the coil can be converted to direct-current power using a rectifier in device 10. In configurations in which the power receiving circuit of device 10 receives power via a wired connection, the power receiving circuit may provide the received power to a battery and/or other circuitry in device 10.

Case 14 may include one or more calibration components such as optical structures 42 for calibrating outward-facing cameras in device 10, optical components 46 for calibrating inward-facing cameras in device 10, optical sensors 40 for calibrating displays in device 10, motion sensors such as motion sensor 66 for calibration motion sensors in device 10, and other calibration components 82 such as calibration magnets and/or magnetic sensors for interacting with corresponding magnetic sensors and/or calibration magnets in device 10. Optical components 46 and optical sensors 40 may be mounted to a support structure in case 14 such as support structure 44. Support structure 44 may form an island in the middle of recess 32 so that device 10 can occupy the space between support structure 44 and the outer housing walls formed by housing 28.

Optical components 42 may include first and second optical components for respectively calibrating first and second optical sensors in device 10 such as a left outward-facing camera and a right outward-facing camera. Optical components 46 may include first and second optical components for respectively calibrating first and second optical sensors in device 10 such as a left inward-facing camera and a right inward-facing camera.

Optical components 42 and 46 may include optically detectable features such as one or more optical charts (e.g., physical optical charts or calibration charts such as printed optical charts and/or displayed optical charts created with one or more light sources), one or more physical fiducials, one or more light sources for creating an image or other optically detectable element, one or more diffractive optical elements (e.g., diffraction gratings) for creating a light pattern such as an array of dots, one or more reflective calibration spheres, and/or one or more other optical calibration components for calibrating optical components in device 10 such as displays and cameras.

Optical sensors 40 may include first and second optical sensors for respectively calibrating first and second displays such as a left display and a right display in device 10. Optical sensors 40 may include image sensors such as visible light image sensors having a two-dimensional array of image sensing pixels. Optical sensors 40 may be fixed-focus cameras or auto-focus cameras and may be configured to capture images of content being displayed on the displays of device 10 such as crosshair images, calibration charts, optical charts, and/or other images in order to determine if there is any shift in the displayed images, which may in turn indicate whether the displays or other components in device 10 need calibration.

Motion sensor 66 may include one or more accelerometers, gyroscopes, compasses, etc. Motion sensors 66 may be used to calibrate motion sensors in device 10. For example, control circuitry 96 and/or control circuitry 94 (FIG. 1) may gather motion data from sensor 66 and may compare the motion data to motion data that is gathered by one or more motion sensors in device 10. This comparison may in turn indicate whether motion sensors in device 10 need calibration.

Components 82 may include magnetic calibration components. For example, components 82 may be magnets that are detected using magnetic sensors in device 10 (e.g., magnetic angle sensors) and/or may include magnetic sensors that are used to detect magnets in device 10. The interaction between components 82 and corresponding magnetic sensors and/or magnets in device 10 may indicate whether certain components are in proper alignment.

Calibration components in case 14 such as optical structures 42, optical components 46, optical sensors 40, motion sensors such as motion sensor 66, and other calibration components 82 may be used for calibrating any suitable component within device 10. For example, the position of each display may be compared to that of the waveguide to which the display supplies its image output, thereby allowing device 10 to detect any misalignment of the left display with respect to the left waveguide and to detect any misalignment of the right display with respect to the right waveguide. Additionally, positions of left and right displays 22 may be compared to one another based on the output from calibration components in case 14 to ensure that the left display system is appropriately aligned with respect to the right display system. In response to detecting misalignment between left and right displays and/or left and right waveguides, corrective action may be taken. Corrective action may include alerting the user of device 10, using a positioner to realign relevant components in device 10, and/or applying digital image processing to the images output by left and right displays 22 (e.g., to geometrically transform the output images to warp the images supplied to eye boxes 20 by an amount that compensates for any detected misalignment-induced image warping, etc.).

Figure 4:
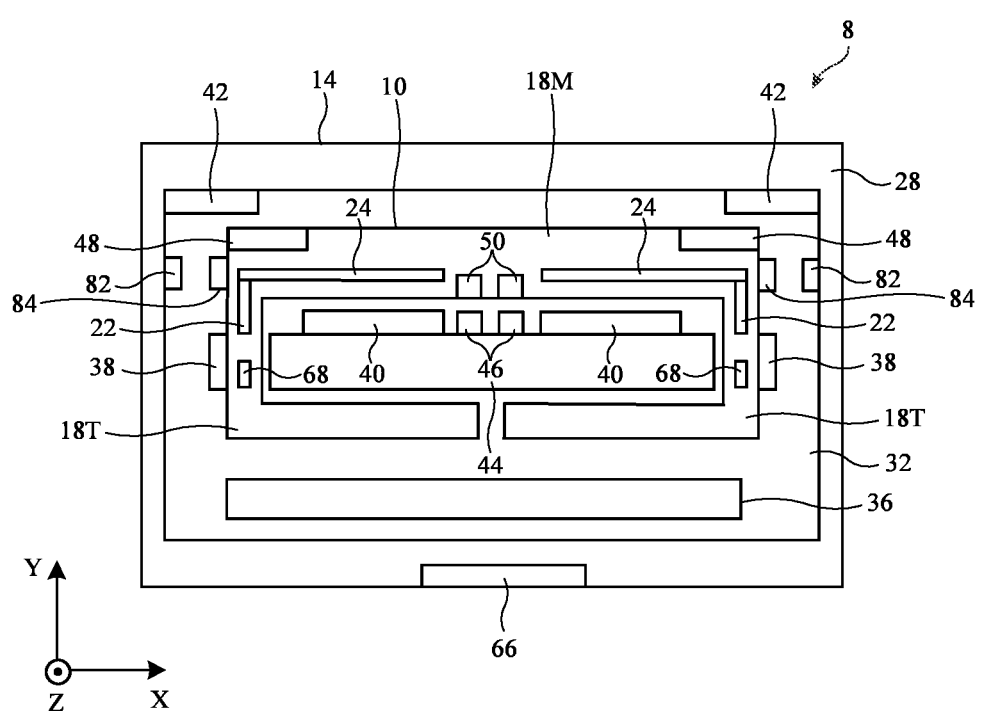
FIG. 4 is a top view of the illustrative storage case of FIG. 3 in which a head-mounted device has been placed in accordance with an embodiment.

FIG. 4 is a top view of the illustrative storage case of FIG. 3 in which a head-mounted device has been stored. As shown in FIG. 4, head-mounted device 10 may be received within recess 32 of case 14. When head-mounted device 10 is received within recess 32, contacts 38 on case 14 may couple to mating contacts on device 10 (if desired) and the calibration components in case 14 may automatically be aligned with the respective components in device 10 that will be calibrated. For example, support structure 44 may be interposed between main housing portion 18M and temples 18T of device 10 to align the calibration components on support structure 44 such as optical components 46 and cameras 40 with corresponding components in main housing portion 18M. In particular, a left optical component 46 may be aligned with a left inward-facing camera 50, a right optical component 46 may be aligned with a right inward-facing camera 50, a left camera 40 may be aligned with a left display 22 and waveguide 24, and a right camera 40 may be aligned with a right display 22 and waveguide 24. Calibration operations may automatically take place in response to device 10 being inserted into case 14, or calibration operations may take place in response to other actions or information such as user input, sensor data (e.g., sensor data indicating when case 14 is coupled to a power source, sensor data indicating that a drop event or other event has occurred, etc.), a predetermined calibration schedule, and/or other information.

During calibration operations, each camera 40 on case 14 may capture one or more images of a calibration image (e.g., a crosshair image, an optical chart, a pattern of dots, and/or other suitable calibration image) that is being displayed by display 22 and waveguide 24 of device 10. Similarly, each inward-facing camera 50 may capture one or more images of optical component 46 (e.g., an optical chart that is printed or displayed on support structure 44, one or more physical fiducials, one or more light sources for creating an image or other optically detectable element, one or more diffractive optical elements (e.g., diffraction gratings) for creating a light pattern such as an array of dots, one or more reflective calibration spheres, and/or other structures that can be detected with inward-facing camera 50). Control circuitry 96 in case 10 and/or control circuitry 94 in device 10 may gather data from cameras 40 and cameras 50 to determine whether calibration is needed.

Figure 5:
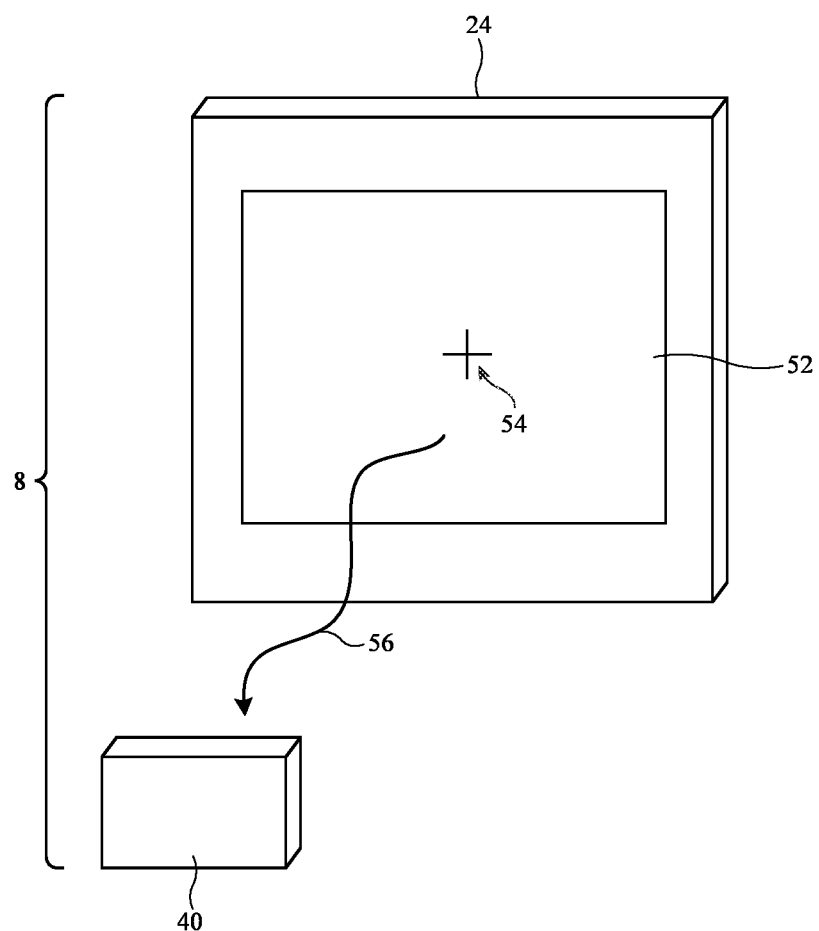
FIG. 5 is a perspective view of an illustrative image sensor that may be included in a storage case for calibrating a display of a head-mounted device received within the storage case in accordance with an embodiment.

The example of FIGS. 4 and 5 in which cameras 40 are located on the user-facing side of main housing portion 18M is merely illustrative. If desired, cameras 40 may instead or additionally be located on a world-facing side of main housing portion 18M. For example, device 10 may include one or more external displays (e.g., publicly viewable displays) on the world-facing side of housing 18M. Case 14 may include one or more cameras for capturing images of images that are displayed on the external display of device 10 while device 10 is located in case 14. Control circuitry 96 in case 10 and/or control circuitry 94 in device 10 may gather data from these cameras to determine whether calibration is needed of the externa display on device 10.

As shown in FIG. 4, placing device 10 in case 14 also aligns optical components 42 with outward facing cameras 48. During calibration operations, each outward-facing camera 48 may capture one or more images of optical component 42 (e.g., an optical chart that is printed or displayed on housing 28 or other surface, one or more physical fiducials, one or more light sources for creating an image or other optically detectable element, one or more diffractive optical elements (e.g., diffraction gratings) for creating a light pattern such as an array of dots, one or more reflective calibration spheres, and/or other structures that can be detected with outward-facing camera 48). Because outward-facing cameras 48 are used for capturing the user's environment, cameras 50 may have a relatively large focal distance, which may make it challenging to use optical components on case 14 to calibrate cameras 48. If desired, optical components 42 may include a laser emitter and diffractive optical element such as a diffraction grating that creates a light pattern (e.g., an array of dots) that appears farther away from cameras 48 than components 42 actually are. Control circuitry 96 in case 10 and/or control circuitry 94 in device 10 may gather data from cameras 48 to determine whether calibration is needed.

Components 48, 50, 46, 40, and 42 may operate at visible and/or infrared wavelengths (e.g., may emit and detect infrared light having a wavelength of at least 850 nm, 870 nm, 850-1000 nm, at least 860 nm, at least 900 nm, less than 1400 nm, less than 1200 nm, less than 1100 nm, less than 1000 nm, less than 950 nm, 940 nm, less than 930 nm, 900-1000 nm, etc.).

Calibration operations may also involve other components in case 14 such as magnetic components 82 and motion sensor 66. Motion sensor 66 may be used to calibrate motion sensors in device 10 such as motion sensors 68. Magnetic components 82 may include a magnet that is detected by a magnetic angle sensor in device 10 such as magnetic sensor 84. For example, sensor 84 may be used to detect alignment of waveguide 24 relative to display 22. Magnet 82 in case 14 may be aligned with respect to a global coordinate system. Magnetic sensor 84 may be configured to detect magnet 82 and may accurately measure the position of waveguide 24 and display 22 relative to magnet 82.

FIG. 5 is a perspective view of system 8 showing how camera 40 on case 14 may be used to calibrate display 22 and waveguide 24 of device 10. During calibration operations when device 10 is received within recess 32 of case 14, camera 40 may be aligned with the location where images are displayed on device 10. Display 22 may emit a calibration image such as image 52 into waveguide 24 and waveguide 24 may direct image 52 towards camera 40 of case 14 (e.g., image light 56 may be directed towards a location where eye box 20 would normally be when device 10 is being worn on the user's head). In the example of FIG. 5, calibration image 52 includes crosshairs 54. Camera 40 may capture one or more images of calibration image 52 including crosshairs 54. Control circuitry 94 and/or control circuitry 96 may determine whether there is misalignment between display 22 and waveguide 24 based on images captured by camera 40. The use of crosshairs 54 in image 52 is merely illustrative. If desired, image 52 may instead or additionally include an optical chart (e.g., letters, symbols, shapes, etc. of different sizes), lines, patterns, and/or any other suitable image that can be detected by camera 40 and used to detect alignment between display 22 and waveguide 24.

In the event that a thermally induced change and/or stress-induced misalignment causes projector display 22 to become misaligned with respect to waveguide 24, suitable action may be taken. If, as an example, it is determined that projector 22 is misaligned from its intended axis by 2°, control circuitry in device 10 can conclude that the image supplied to eye box 20 will be distorted (e.g., the image will be warped and will exhibit keystoning) absent corrective action. Accordingly, when a 2° misalignment is measured, the control circuitry in device 10 can apply a corrective (equal and opposite) geometric transformation to the images being produced by projector display 22, thereby implementing a corrective image warping for the images being produced by display 22. This ensures that the images viewed by the user in eye box 20 will be free of geometric distortion due to the angular misalignment of display 22 relative to waveguide 24. In general, any image distortion due to measured misalignment may be corrected in this way (e.g., image translation, rotation, etc.). If desired, other corrective action may be taken such as alerting the user of device 10, using a positioner to realign relevant components in device 10, and applying digital image processing to the images output by displays 22 (e.g., to geometrically transform the output images to warp the images supplied to eye boxes 20 by an amount that compensates for any detected misalignment-induced image warping, etc.).

If desired, data from additional sensors (e.g., visual inertial odometry sensors, structured light sensors, time of flight sensors, position sensors, strain gauges that can measure housing bends and therefore component misalignment, etc.) may be used in combination with data from camera 40 (e.g., a sensor fusion arrangement may be used to enhance misalignment compensation accuracy and/or to otherwise improve the performance of operations using the position sensors). The use of image sensor data gathered by cameras 40 in case 14 may sometimes be described herein as an example. In general, however, any suitable operations may be performed using image sensor data and/or data from other sensors (e.g., control operations, etc.).

Figure 6:
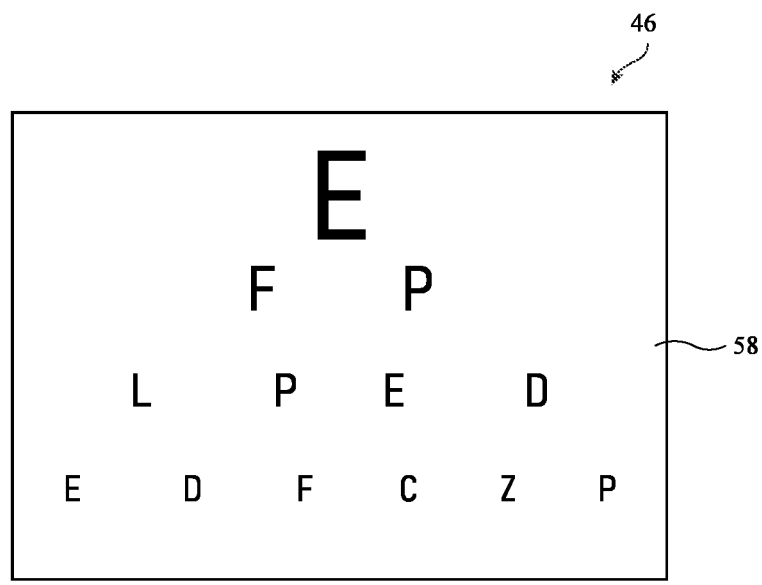
FIG. 6 is an illustrative camera calibration chart that may be used to calibrate a camera of a head-mounted device that is received within a storage case in accordance with an embodiment.

FIG. 6 is a front view of an illustrative optical component in case 14 that may be used to calibrate image sensors in device 10 such as inward-facing cameras 50. As shown in FIG. 6, optical component 46 may include one or more optically detectable features such as optical chart 58. Optical chart 58 (sometimes referred to as a test chart or camera calibration chart) may include letters, numbers, symbols, patterns, a grid of lines, dots, crosshairs, shapes, and/or other elements that can be imaged by inward-facing camera 50 of device 10. Control circuitry 94 and/or control circuitry 96 may determine whether there is any misalignment and/or distortion in camera 50 based on images captured by camera 50 of optical chart 58. In response to detecting misalignment, corrective action may be taken. Corrective action may include alerting the user of device 10, using a positioner to realign relevant components in device 10, and/or applying digital image processing to the images captured by cameras 50.

Figure 7:
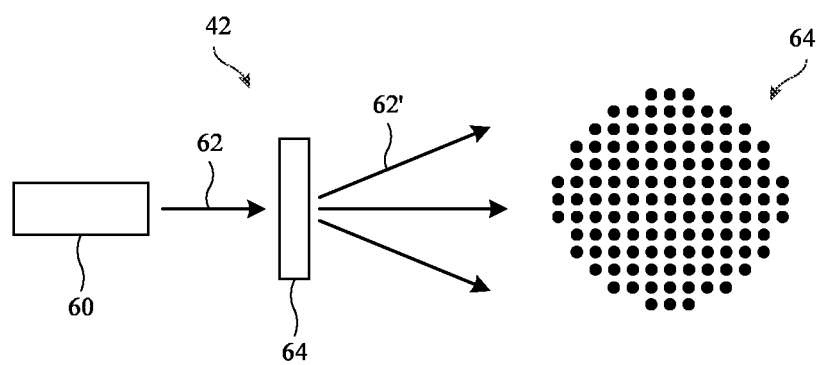
FIG. 7 is a diagram of illustrative optical components that may be used to produce a light pattern for calibrating an image sensor of a head-mounted device that is received within a storage case in accordance with an embodiment.

FIG. 7 is a diagram of illustrative optical component in case 14 that may be used to calibrate image sensors in device 10 such as outward-facing cameras 48. Because outward-facing cameras 48 have relatively large focal distances, optical components 42 may include diffractive optical elements such as diffraction gratings that may be used to produce calibration images that appear to be generated from a larger distance (e.g., infinity). Optical components 42 may include one or more light sources such as light source 60 and diffractive optical element 64 (sometimes referred to as a diffraction grating). Light source 60 may be a collimated light source such as a laser (e.g., a vertical cavity surface-emitting laser or other suitable laser) and may include additional optical components such as a beam expander or light collimator. Diffractive optical element 64 may be a grating or other diffractive optical element. Laser 60 may be configured to emit collimated light 62 through diffractive optical element 64. Diffractive optical element 64 may diffract the light to form diffracted light 62'. Diffracted light 62' may generate a grid of points 64 (e.g., a dot array) that virtually originates from infinity. Outward-facing camera 48 may capture one or more images of dot grid 64. Control circuitry 94 and/or control circuitry 96 may determine whether there is any misalignment and/or distortion in camera 48 based on images captured by camera 48 of dot grid 64. In response to detecting misalignment, corrective action may be taken. Corrective action may include alerting the user of device 10, using a positioner to realign relevant components in device 10, and/or applying digital image processing to the images captured by cameras 48.

Figure 8:
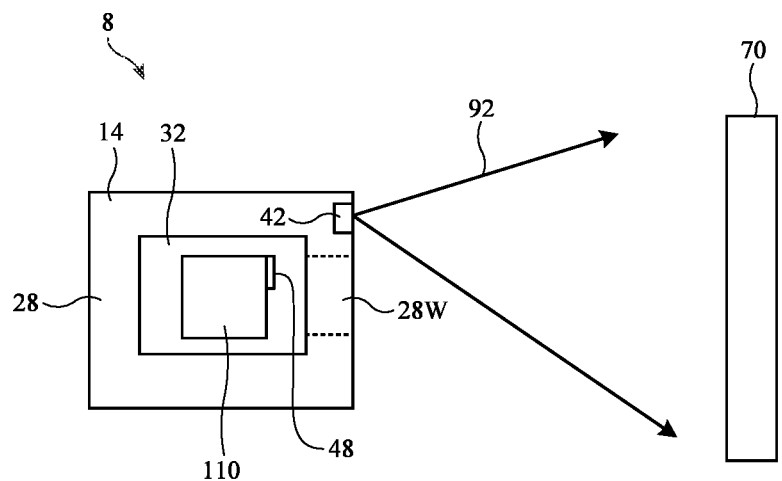
FIG. 8 is a side view of an illustrative storage case having optical components for projecting an image onto an external surface for calibrating a sensor in a head-mounted device that is received with the storage case in accordance with an embodiment.

FIG. 8 is a side view of system 8 in an illustrative configuration in which optical components 42 project a calibration image onto an external surface for calibrating outward-facing cameras 48. As shown in FIG. 8, optical components 42 may include one or more light sources such as a projector display that projects light 92 onto an external surface such as external surface 70. Component 42 may be formed on an exterior of case 14 or may be mounted within case 14 and may emit light 92 through a window or other transparent portion of case 14. Light 92 may form a calibration image on surface 70 such as an optical chart, letters, numbers, symbols, patterns, a grid of lines, dots, crosshairs, shapes, and/or other elements. Outward-facing camera 48 may be configured to capture one or more images of the displayed calibration image on surface 70. Since device 10 is mounted in case 14, case 14 may include one or more transparent windows such as window 28 W in housing 28 that allows camera 48 to capture images of light 92 on surface 70 through window 28 W. Control circuitry 94 and/or control circuitry 96 may determine whether there is any misalignment and/or distortion in camera 48 based on images captured by camera 48 of the image on surface 70. In response to detecting misalignment, corrective action may be taken. Corrective action may include alerting the user of device 10, using a positioner to realign relevant components in device 10, and/or applying digital image processing to the images captured by cameras 48.

Figure 9:
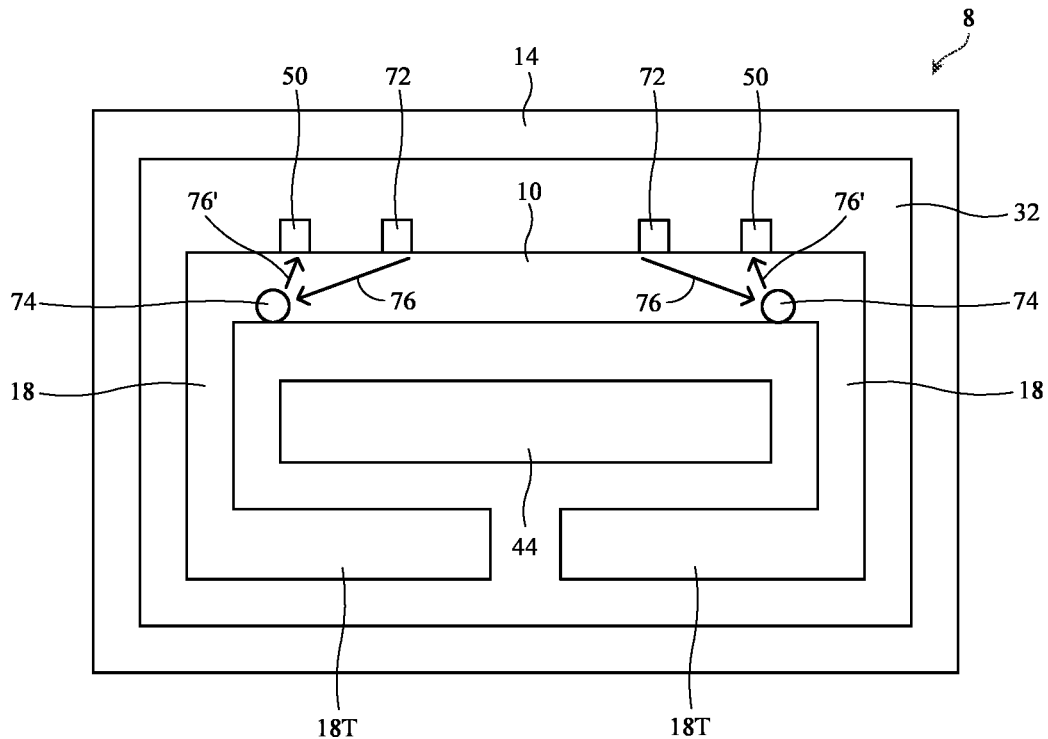
FIG. 9 is a top view of an illustrative storage case having reflective calibration spheres for calibrating image sensors in a head-mounted device that is received within the storage case in accordance with an embodiment.

FIG. 9 is a top view of system 8 showing how case 14 may include reflective calibration spheres for calibrating optical components in device 10 such as inward-facing cameras 50. Device 10 may include a gaze tracking system such as eye-glint-based systems. A glint-based gaze tracking system may include light-emitting devices such as light-emitting devices 72 that emit light beams that create eye glints on the surface of a user's eyes. Light-emitting devices 72 may be laser diodes, light-emitting diodes, and/or other light sources. Inward-facing camera 50 may include an image sensor that measures the eye glints. The pattern of eye glints may be analyzed to produce information on the user's gaze.

During calibration operations when device 10 is received within recess 32 of case 14, light-emitting diodes 72 may emit light 76 towards calibration spheres 74. Calibration spheres 74 may be small reflective spheres (e.g., formed from metal or other suitable material) or other shapes that reflect light 76' back towards inward-facing cameras 50. Control circuitry 94 and/or control circuitry 96 may determine whether there is any misalignment and/or distortion in camera 50 based on images captured by camera 50 of the light 76' reflected by sphere 74. In response to detecting misalignment, corrective action may be taken. Corrective action may include alerting the user of device 10, using a positioner to realign relevant components in device 10, and/or applying digital image processing to the images captured by cameras 50.

Figure 10:
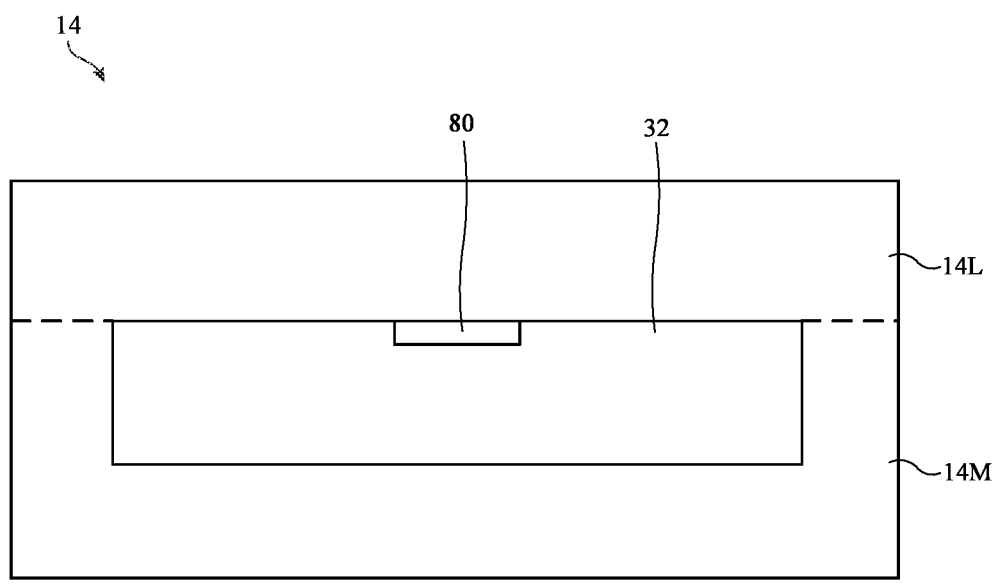
FIG. 10 is a side view of an illustrative storage case having a lid with one or more protruding portions for calibrating a force sensor of a head-mounted device that is received within the storage case in accordance with an embodiment.

FIG. 10 is a top view of case 14 showing how case 14 may include surfaces for calibrating force sensors in device 10. For example, device 10 may include one or more strain gauges such as a strain gauge in the nose bridge region such as nose bridge region D of FIG. 2. Strain gauges in nose bridge region D may be used to detect distortion or misalignment in device 10. To ensure that this type of strain gauge is providing reliable feedback, case 14 may include one or protrusions such as protrusion 80. Protrusion 80 may be located on a portion of case 14 such as an interior surface of lid 14L. Lid 14L may be coupled to main portion 14M of case 14 via a hinge, a friction fit, a magnetic attachment, and/or any other suitable attachment means. Lid 14L may form an upper ceiling that helps enclose device 10 within case 14. When case 10 is received within recess 32, protrusion 80 may apply a predetermined and/or expected amount of pressure to the strain gauge or other force sensor on device 10. Control circuitry 94 and/or control circuitry 96 may determine whether the force measured by the force sensor on device 10 matches the expected force that should be detected by a properly working force sensor. In response to detecting a significant difference between the expected force value and the measured force value, corrective action may be taken. Corrective action may include alerting the user of device 10, using a positioner to realign relevant components in device 10, and/or applying processing to the force data gathered by the force sensor on device 10.

In accordance with an embodiment, a storage case for a head-mounted device is provided that includes a housing having a recess configured to receive the head-mounted device, the housing has opposing interior and exterior surfaces and the interior surface faces the recess, and a camera for calibrating the head-mounted device, the camera is located on the interior surface of the housing and faces the recess, and the camera is configured to capture an image of a displayed image on the head-mounted device when the head-mounted device is received within the recess.

In accordance with another embodiment, the camera includes a fixed focus camera.

In accordance with another embodiment, the camera includes a visible light camera.

In accordance with another embodiment, the storage case includes control circuitry configured to analyze the image to determine if the head-mounted device needs calibration.

In accordance with another embodiment, the head-mounted device includes a display and a waveguide that are used to produce the displayed image and the control circuitry is configured to determine whether the display and the waveguide are misaligned based on the image.

In accordance with another embodiment, the displayed image includes crosshairs and the camera is configured to capture the image of the crosshairs in the displayed image.

In accordance with another embodiment, the storage case includes an additional camera on the support structure, the additional camera is configured to capture an additional image of an additional displayed image on the head-mounted device when the head-mounted device is received within the recess.

In accordance with another embodiment, the storage case includes an optical chart in the housing, the optical chart faces an inward-facing camera on the head-mounted device when the head-mounted device is received within the recess.

In accordance with an embodiment, a system is provided that includes a storage case having a recess and having an optically detectable feature, a head-mounted device configured to be received within the recess and having an image sensor, the image sensor is configured to capture an image of the optically detectable feature, and control circuitry configured to process the image of the optically detectable feature to determine if the image sensor needs calibration.

In accordance with another embodiment, the optically detectable feature is selected from the group consisting of: an optical chart and a physical fiducial.

In accordance with another embodiment, the optically detectable feature includes a reflective calibration sphere, the image sensor includes a gaze tracking image sensor, and the head-mounted device includes a light-emitting diode configured to emit light towards the reflective calibration sphere, and the image sensor detects the light reflected from the reflective calibration sphere.

In accordance with another embodiment, the storage case includes a support structure within the recess and the optically detectable feature is located on the support structure.

In accordance with another embodiment, the head-mounted device includes a main housing portion coupled between first and second temple portions and the support structure is interposed between the main housing portion and the first and second temple portions when the head-mounted device is received within the recess.

In accordance with another embodiment, the head-mounted device includes a force sensor and the storage case includes a lid that applies an expected amount of pressure to the force sensor, the control circuitry processes sensor data from the force sensor to determine if the force sensor needs calibration.

In accordance with another embodiment, the head-mounted device includes a first motion sensor and the storage case includes a second motion sensor and the control circuitry analyzes motion sensor data from the first and second motion sensors to determine if the first motion sensor needs calibration.

In accordance with an embodiment, a storage case for a head-mounted device having an outward-facing camera is provided that includes a housing having a recess for receiving the head-mounted device, a diffraction grating in the housing, and a light source that emits light through the diffractive optical element to produce a light pattern that is detected with the outward-facing camera when the head-mounted device is received within the recess.

In accordance with another embodiment, the storage case includes a camera configured to capture an image of a displayed image on the head-mounted device when the head-mounted device is received within the recess.

In accordance with another embodiment, the light source includes a laser.

In accordance with another embodiment, the light pattern includes an array of dots virtually originating from infinity.

In accordance with another embodiment, the light includes infrared light.

The foregoing is merely illustrative and various modifications can be made to the described embodiments. The foregoing embodiments may be implemented individually or in any combination.

What is claimed is:

1. A storage case for a head-mounted device, comprising:
    a housing having walls that surround a recess configured to receive the head-mounted device;
    a support structure surrounded by the recess;
    a camera for calibrating the head-mounted device, wherein the camera is located on the support structure, and wherein the camera is configured to capture an image of a displayed image on the head-mounted device when the head-mounted device is received within the recess.

2. The storage case defined in claim 1 wherein the camera comprises a fixed focus camera.

3. The storage case defined in claim 1 wherein the camera comprises a visible light camera.

4. The storage case defined in claim 1 further comprising control circuitry configured to analyze the image to determine if the head-mounted device needs calibration.

5. The storage case defined in claim 4 wherein the head-mounted device comprises a display and a waveguide that are used to produce the displayed image and wherein the control circuitry is configured to determine whether the display and the waveguide are misaligned based on the image.

6. The storage case defined in claim 1 wherein the displayed image comprises crosshairs and wherein the camera is configured to capture the image of the crosshairs in the displayed image.

7. The storage case defined in claim 1 further comprising an additional camera on the support structure, wherein the additional camera is configured to capture an additional image of an additional displayed image on the head-mounted device when the head-mounted device is received within the recess.

8. The storage case defined in claim 1 further comprising:
    an optical chart in the housing, wherein the optical chart faces an inward-facing camera on the head-mounted device when the head-mounted device is received within the recess.

9. A system, comprising:
    a storage case having a recess, an optically detectable feature, and a first motion sensor;
    a head-mounted device configured to be received within the recess and having an image sensor and a second motion sensor, wherein the image sensor is configured to capture an image of the optically detectable feature; and
    control circuitry configured to process the image of the optically detectable feature to determine if the image sensor needs calibration, wherein the control circuitry analyzes motion sensor data from the first and second motion sensors to determine if the second motion sensor needs calibration.

10. The system defined in claim 9 wherein the optically detectable feature is selected from the group consisting of: an optical chart and a physical fiducial.

11. The system defined in claim 9 wherein the optically detectable feature comprises a reflective calibration sphere, the image sensor comprises a gaze tracking image sensor, and the head-mounted device comprises a light-emitting diode configured to emit light towards the reflective calibration sphere, and wherein the image sensor detects the light reflected from the reflective calibration sphere.

12. The system defined in claim 9 wherein the storage case comprises a support structure within the recess and wherein the optically detectable feature is located on the support structure.

13. The system defined in claim 12 wherein the head-mounted device comprises a main housing portion coupled between first and second temple portions and wherein the support structure is interposed between the main housing portion and the first and second temple portions when the head-mounted device is received within the recess.

14. A system, comprising:
    a storage case having a recess and having an optically detectable feature;
    a head-mounted device configured to be received within the recess and having an image sensor, wherein the image sensor is configured to capture an image of the optically detectable feature; and control circuitry configured to process the image of the optically detectable feature to determine if the image sensor needs calibration, wherein the head-mounted device comprises a force sensor, wherein the storage case comprises a lid that applies an expected amount of pressure to the force sensor, and wherein the control circuitry processes sensor data from the force sensor to determine if the force sensor needs calibration.

15. A storage case for a head-mounted device having an outward-facing camera, comprising:
 a housing having a recess for receiving the head-mounted device;
 a diffraction grating in the housing; and
 a light source that emits light through the diffraction grating to produce a light pattern that is detected with the outward-facing camera when the head-mounted device is received within the recess.

16. The storage case defined in claim 15 further comprising a camera configured to capture an image of a displayed image on the head-mounted device when the head-mounted device is received within the recess.

17. The storage case defined in claim 15 wherein the light source comprises a laser.

18. The storage case defined in claim 15 wherein the light pattern comprises an array of dots virtually originating from infinity.

19. The storage case defined in claim 15 wherein the light comprises infrared light.

* * * * *